United States Patent [19]
Steckel

[11] Patent Number: 5,925,698
[45] Date of Patent: Jul. 20, 1999

[54] POWDER COATING COMPOSITION AND METHOD FOR COATING A SUBSTRATE USING SAID POWDER COATING COMPOSITION

[75] Inventor: Thomas F. Steckel, Chagrin Falls, Ohio

[73] Assignee: The Lubrizol Corporation, Wickliffe, Ohio

[21] Appl. No.: 09/023,109

[22] Filed: Feb. 13, 1998

Related U.S. Application Data

[60] Provisional application No. 60/040,713, Mar. 14, 1997.

[51] Int. Cl.$^6$ ............................... C08K 5/09; C08K 5/05; C08L 63/00
[52] U.S. Cl. .................. 524/322; 524/377; 524/386; 524/387; 524/394; 524/559; 524/904; 523/403; 523/414; 523/427; 525/934
[58] Field of Search ..................... 524/322, 377, 524/386, 387, 394, 559, 904; 523/403, 414, 427; 525/934

[56] References Cited

U.S. PATENT DOCUMENTS

| | | |
|---|---|---|
| 3,455,726 | 7/1969 | Mitchell, Jr. et al. ............... 117/76 |
| 4,289,828 | 9/1981 | Ota et al. ............... 428/425.9 |
| 4,385,138 | 5/1983 | Sagane et al. ............... 523/402 |
| 5,389,162 | 2/1995 | Endou et al. ............... 148/257 |

FOREIGN PATENT DOCUMENTS

| | | |
|---|---|---|
| 57-30119 | 2/1982 | Japan . |
| 57-102317 | 6/1982 | Japan . |
| 59-15457 | 1/1984 | Japan . |
| 59-111947 | 6/1984 | Japan . |
| 60-26057 | 6/1985 | Japan . |
| 63-33791 | 7/1988 | Japan . |

*Primary Examiner*—James J. Seidleck
*Assistant Examiner*—Olga Asinovsky
*Attorney, Agent, or Firm*—Krishna G. Banerjee; David M. Shold

[57] ABSTRACT

The present invention is directed to a powder coating composition containing at least one film forming resin and a non-flatting and slip-enhancing amount of at least one additive. The additive is a non-crosslinked reaction product of a hydroxy compound and a carboxylic acid where the reaction product contains at least one ester functionality and at least one straight chain hydrocarbyl group of about 10 to about 100 carbon atoms. The most preferred additive is sorbitan tristearate. The cured powder coatings exhibit lower coefficient of friction and substantial gloss retention.

51 Claims, No Drawings

5,925,698

POWDER COATING COMPOSITION AND METHOD FOR COATING A SUBSTRATE USING SAID POWDER COATING COMPOSITION

Priority is herein claimed under 35 USC § 119 from U.S. Provisional application Ser. No. 60/040,713 filed Mar. 14, 1997.

BACKGROUND OF THE INVENTION

1. Field of the Invention

The present invention relates to powder coating compositions containing a non-flatting and slip-enhancing amount of an additive, and a process for coating a substrate using the powder coating composition.

2. Description of Related Art

Slip is the relative movement between two objects that are in contact with each other. If an object is moved along a surface, there is a resistance acting in a direction opposite the movement. The resisting force is also called frictional force, friction resulting from the unevenness of the two surfaces in contact.

Coating systems, including powder coatings are susceptible to damage when in contact with solid objects. Paint films, for instance, can be easily damaged during drying, when they have not yet cured. In the case of baking enamels, damage can occur when the films have not yet cooled. In addition, scratches, which are discontinuities on surfaces, can cause attachment of air-borne contaminants and corrosive agents leading eventually to corrosion problems. Powder coating systems are well known to those skilled in the art. A common problem with many powder coatings is that they are subject to mar or scratching.

Slip additives provide some degree of protection against such damages. For example, in automotive coating applications, they protect the not fully hardened freshly applied enamels, and in can coatings, they protect the coating during filling and distribution.

The concepts of slip and mar (or scratch) resistance are very closely interrelated in that the same additive may perform both functions—impart slip and provide scratch resistance; in addition the principle underlying both is the same. A hard object touching a paint film containing an additive can be deflected due to the surface lubricity of the additive. This results in a greater apparent film hardness or scratch resistance.

A slip additive should fulfill several requirements. The additive should migrate to the film surface during the drying process, forming a film which not only adheres to the coating, but also favorably influences its flow and leveling properties. In addition, this film should have lubricating qualities, expressed as the ability to carry a load in a very thin layer.

Compounds based on silicone chemistry have been used as mar and slip additives for about 30 years. Examples of silicone-based slip additives include polydimethylsiloxanes, polyoxyalkylenesiloxane (polysiloxane/polyether) copolymers, and polyoxyalkylene methylalkylsiloxane copolymers.

The problem with many slip additives is that they reduce the gloss of the cured coating. The present invention provides enhanced slip (reduction of coefficient of friction) to cured powder coatings useful in rendering the cured coatings more resistant to mar or scratch without an appreciable loss in gloss.

A detailed description describing the concept of slip and mar and the developments of additives to improve scratch resistance and impart slip can be found in an article by F. Fink, et al., entitled "Development of New Additives to Improve Scratch Resistance and Impart Slip To Solvent-Based Coating Systems" in *Journal of Coatings Technology*, Vol. 62, No. 791, December 1990.

U.S. Pat. No. 3,455,726, Mitchell, Jr. et al., Jul. 15, 1969, discloses an article comprising a paper substrate, a moisture resistant film of polymer, selected from the group consisting of vinylidene chloride polymers, polyethylene and polypropylene superimposed on said substrate, and a slip coating on said film, said slip coating consisting essentially of a partial ester of a fatty acid and hexitol anhydride, including a polyoxyethylene derivative of said ester.

U.S. Pat. No. 4,289,828, Ota et al., Sep. 15, 1981, discloses a magnetic recording medium made by coating a base with a magnetic coating materials which is a dispersion of magnetic particles in a binder of synthetic resins using a polyfunctional aromatic isocyanate as a curing agent, characterized by the addition of a sorbitan stearate type surface active agent.

Japanese Laid-open Patent Publication No. 57-30119, Nishimatsu, Feb. 18, 1982, discloses a magnetic recording medium, comprising a magnetic paint containing a curing component and a surfactant and applied on a substrate, wherein said curing component contains isophorone diisocyanate, and said surfactant contains a saturated fatty acid ester of sorbitan.

SUMMARY OF THE INVENTION

The present invention relates to a powder coating composition, comprising: (a) a film-forming resin composition; and (b) a non-flatting and slip-enhancing amount of an additive comprising a non-crosslinked reaction product of a hydroxy compound and a carboxylic acid or a reactive equivalent of said carboxylic acid; said reaction product comprising at least one ester functionality and at least one straight chain hydrocarbyl group of about 10 to about 100 carbon atoms.

The invention also relates to a method for a coating a substrate using the foregoing powder coating composition.

DETAILED DESCRIPTION OF THE INVENTION

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

(1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical);

(2) substituted hydrocarbon substituents, that is, substituents containing non-hydrocarbon groups which, in the context of this invention, do not alter the predominantly hydrocarbon substituent (e.g., halo (especially chloro and fluoro), hydroxy, alkoxy, mercapto, alkylmercapto, nitro, nitroso, and sulfoxy);

(3) hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, preferably no more than one, non-hydrocarbon substituent will be present for every ten carbon atoms in the hydrocarbyl group; typically, there will be no non-hydrocarbon substituents in the hydrocarbyl group.

A straight-chain hydrocarbyl group is a hydrocarbyl group that is free from branching and ring structures. However, such a hydrocarbyl group can still have a hetero substituent that does not alter the predominantly hydrocarbon character of the hydrocarbyl group.

The phrase "reactive equivalent" of a material means any compound or chemical composition other than the material itself which reacts or behaves like the material itself under the reaction conditions. Thus reactive equivalents of a carboxylic acid will include acid-producing derivatives such as an anhydride, an acyl halide, and mixtures thereof unless specifically stated otherwise.

Powder coating compositions are well known to those skilled in the art. They are coating compositions made almost entirely from solid components. Although in such a composition, there might be a few components that might be in the form of a liquid, the composition as a whole is in the form of a powder. The word "powder" here is meant to include not only materials with a very small particle size (less than about 10 micron) but also those with larger sizes, such as granules and other particulate matter. Typically, the particle size of a power coating composition will vary from 0.3 to 300 microns, more commonly from 0.3 to 105 microns. Powder coatings were developed in response to a recognized need and desire by the coatings industry to reduce energy consumption and solvent emission.

Film-Forming Resin Composition (a)

One component of the present powder coating composition is a film-forming resin composition. The words "film forming resin composition" include the complete system of:

1) a polymer (also called resin or "binder") that is capable of forming a film (the "film-forming resin") either with a curing agent (also known as crosslinking agent, curative, crosslinker or hardener) or without a curing agent (such as by air-drying or by the application of heat);

2) a crosslinking agent, if necessary;

3) any catalyst or accelerator that may be necessary to facilitate the reaction between the film forming resin and the crosslinking agent.

Polymers which can be employed as the film forming resin include polyester resins, acrylic resins and epoxy resins.

As the words "film forming resin composition" include any curative (crosslinking agent) that may be used for crosslinking, the aforementioned resins also intrinsically include urethane resins which form when a di-or polyisocyanate group (—NCO—) bearing intermediate (such as an isocyanate curative) reacts with a di- or polyhydroxyl-bearing species. The species used to react with the isocyanate functionality can be described as any hydrogen donor bearing two or more active hydrogens. Although there is a large array of hydrogen donors for use by the paint chemist in the preparation of polyurethane coatings, hydroxyl-based systems are especially useful. Useful hydroxyl-based systems include hydroxylated acrylics, hydroxylated (saturated) polyesters, epoxies and other polyether-based polyols, polycaprolactone-based polyols, castor oil derivatives, and polyamides, phenolics and amino systems. Useful isocyanate-terminated species include the aliphatics, hexamethylene diisocyanate and isophorone diisocyanate and the aromatic species, toluene diisocyanate and diphenylmethyl diisocyanate.

The film-forming resin can be a thermoplastic resin or a thermosetting resin. Thermoplastic resins do not chemically react upon the application of heat but melt and flow over the part to be coated. Upon cooling, the film hardens can be remelted again by the simple application of heat. Thermosetting resins are reactive systems, and a chemical reaction—crosslinking—takes place between the resin and a hardener (crosslinking agent) molecules upon application of heat. This leads to a cured or hardened film which can no longer be melted upon reheating. Thermosetting resins also include water curing systems, such as moisture curing urethanes.

Suitable examples of thermoplastic resins for powder coating compositions include polyolefins, including low density polyethylene (LDPE) and polypropylene, polyvinyl-chloride (PVC), polyamides, polyesters, chlorinated polyethers, and cellulose-acetobutyrate.

What follows is a brief description of the different varieties of film forming resins which may be used in thermoplastic or thermosetting systems. A brief description of the curatives and/or curing reactions is also included when the resin is also used as a thermosetting resin.

In one embodiment, the film forming resins that are useful include the epoxy resins. These include any one of a number of well known organic resins which are characterized by the presence therein of the epoxide group

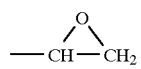

A wide variety of such resins are available commercially. Such resins have either a mixed aliphatic-aromatic or an exclusively non-benzenoid (i.e., aliphatic or cycloaliphatic) molecular structure.

Examples of epoxy resins that can be used include diglycidyl ether of bisphenol A (DGEBA; made by reacting epichlorohydrin with bisphenol A); further reaction products of DGEBA with additional bisphenol A to yield solid, linear and difunctional epoxy resins; and epoxy novolac resins. The epoxy resins can be crosslinked with a variety of hardeners or curing agents to yield coatings with excellent adhesion, good mechanical and physical properties, and very good corrosion resistance. These curing reactions include epoxy-amine reactions, epoxy-phenolic reactions, epoxy-anhydride reactions, epoxy-carboxyl reactions, and epoxy-epoxy reactions.

Another class of resins that are useful include polyester resins. These are the reaction products of multifunctional alcohols (glycols) with multifunctional acids or acid anhydrides. The ratio of glycol to acid or acid anhydride determines the type of reactive end-group, i.e., an excess of glycol will result in hydroxy terminated (or hydroxy functional) polyesters whereas an excess of acid or acid anhydride will result in a carboxyl terminated (or carboxy functional) polyester. Useful starting materials as far as the acidic portion is concerned include terephthalic acid, isophalic acid, maleic anhydride, trimellitic anhydride, and adipic acid. Useful multifunctional alcohols include ethylene glycol, diethylene glycol, 1,4-butanediol, trimethylolpropane, and neopentylglycol. For thermosets (thermosetting resins), curing agents for hydroxy functional polyesters include blocked isocyanates. The aliphatic hydroxyl groups of the OH-functional polyester can react with isocyanates as shown in Scheme I below:

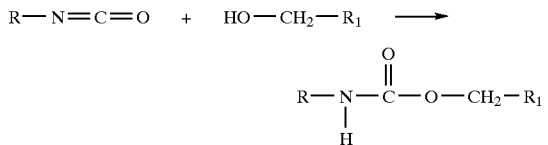

Since this reaction occurs readily at room temperature, it is necessary to block one of the two reactants and this is normally the isocyanate group. A useful blocking agent is ε-caprolactam. Useful isocyanates include toluene diisocyanate (TDI), 4,4'-diphenylmethane diisocyanate (MDI), 1,6-hexamethylene diisocyanate (HMDI) and isophorone diisocyanate (IPDI). In some instances, however, these compounds are considered to be toxic; it is therefore preferable to form an adduct of the diisocyanate with a triol such as trimethylol propane or a diol such as ethylene glycol. This can be done by reacting an excess of the diisocyanate with the alcohol to form an isocyanate terminated adduct, as exemplified in Scheme 2 below.

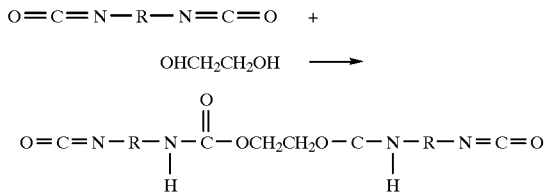

This in turn can be blocked with ε-caprolactam to yield the idealized structure shown in Scheme 3 below:

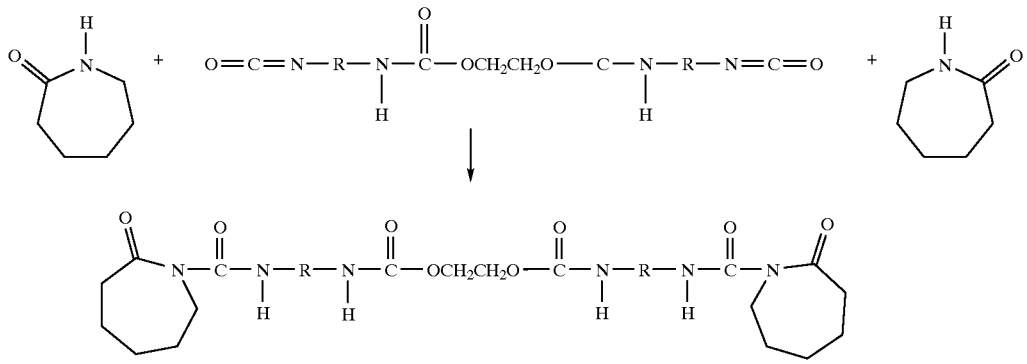

The reactive isocyanate group can be freed during curing and react with the aliphatic hydroxyl groups of the polyester since the ε-caprolactam is released at temperatures above about 160° C.

Other blocking agents for isocyanates (such as ketoximes) can be used provided the blocked isocyanate is in solid state at room temperature.

The crosslinking agents useful for the present invention also include those that are self-blocked ("blocked agent free") isocyanates having a uretdione linkage. Examples of these self-blocked isocyanate crosslinking agents include those available from Hüls America under the tradename "VESTAGON™ BF-1540", having an average equivalent weight of about 280 and an isocyanate content (% NCO) of 14.7 to 16.7. This crosslinking agent is described as a VESTANAT™ IPDI (isophorone diisocyanate) adduct, which has internally blocked structures. As a result, no blocking agent is liberated during curing. The product can be processed up to the unblocking temperature of greater than about 160° C.

In one embodiment of the present invention, the film forming resin composition comprises a polyester resin and an isocyanate-containing curative. That is, a hydroxy-functional polyester is reacted with a blocked isocyanate to result in a polyurethane. The hydroxy-functional polyester has a hydroxy equivalent weight of about 1400 (a hydroxyl number of 35 to 45) and an acid number of 11 to 14. It is marketed by Ruco Polymer Corporation under the name "RUCOTE™ 102". The isocyanate curatives typically include blocked isocyanates which are solids. In a preferred embodiment, the blocked isocyanate is an ε-caprolactam blocked isophorone isocyanate adduct. It has an equivalent weight of about 280 and is marketed by Ruco Polymer Corporation under the name "RUCOTE™ NI-2".

For carboxy functional polyesters, the curing agents include solid polyepoxides and β-hydroxyalkylamides. Useful solid polyepoxide in powder coatings include triglycidyl isocyanurate (TGIC) produced from the reaction between epichlorohydrin and cyanuric acid. The curing mechanism is believed to involve the reaction of the epoxy group with the carboxyl group at elevated temperatures. A base catalyst is sometimes used to accelerate the reaction. Tetrafunctional β-hydroxyalkylamides are believed to crosslink via simple esterification reaction with the elimination of water.

In one embodiment of the present invention, the film forming resin composition comprises an epoxy-polyester hybrid resin. The epoxy component of the hybrid can be a bisphenol A based epoxy resin having an epoxy equivalent weight of 730 to 820. It is a "type 3–3.5" resin having on average 3–3.5 hydroxyl-substituted propoxy bisphenol A units (n=3–3.5 on average in structure below):

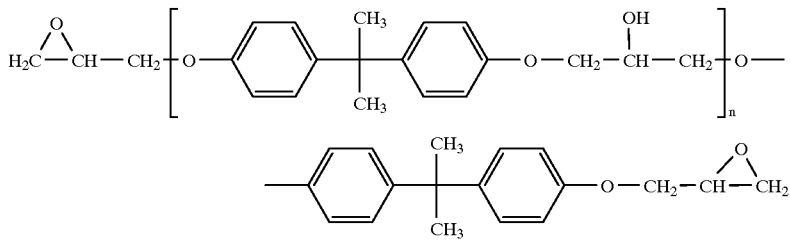

This epoxy resin is available from Dow Chemical Company under the name "D.E.R.™ 663U". The polyester resin in this epoxy-polyester hybrid is believed to be a saturated carboxylated (i.e. carboxy-functionalized) polyester resin, having an acid number of 70 to 85, and a glass transition temperature of about 56° C. This polyester resin is available from DSM Resins. BV under the name "URALAC™ 5127". The curing reaction for this epoxy-polyester hybrid is believed to involve epoxy-carboxyl reactions, where the carboxyl terminated polyester cures the epoxy resin. The reaction between and epoxy group and a carboxylic acid group proceeds readily at elevated temperatures, producing ester and hydroxy functionalities. This reaction sometimes utilizes a suitable catalyst. A commonly employed catalyst is benzyltrimethylammonium chloride. Other compounds such as 2-methylimadazole can also be used as a catalyst for the curing reaction.

Another class of resins that can be used in the present invention are the acrylic resins which are obtained by polymerizing a suitable combination of a functional group-containing monomer and another copolymerizable monomer in an ordinary manner. The polymerization reaction is usually initiated by free radical generators such as benzoyl peroxide or azobisisobutyronitrile (AIBN) and the reaction is a four-part process with the following steps occurring at different rates:. (1) Initiation, (2) Propagation, (3) Chain transfer, and (4) Termination. The polymerization temperature is ordinarily between 60° C. and 100° C. and polymerization time is usually 3 to 10 hours. Examples of the functional group-containing monomers include hydroxyl group-containing monomers such as beta-hydroxyethyl acrylate, beta-hydroxypropyl acrylate, beta-hydoxyethyl methacrylate, beta-hydroxypropyl methacrylate, N-methylol acrylamide and N-methylol methacrylamide; carboxyl-group containing monomers such as acrylic acid, methacrylic acid, itaconic acid, maleic acid, fumaric acid, as well as monoesters of maleic acid and fumaric acid with monoalcohols; alkoxyl group-containing monomers such as N-butoxy-methylmethacrylamide and N-butoxymethylacrylamide; and epoxy group-containing monomers such as glycidyl methacrylate, glycidyl acrylate and allyl glycidyl ether. These monomers may be used either alone or in the form of a combination of two or more of them. The functional group-containing monomer is used in an amount of about 5 to about 40% by weight of total monomers. Examples of the monomers copolymerized with these functional group-containing monomers include olefinically unsaturated monomers such as ethylene, propylene and isobutylene, aromatic monomers such as styrene, vinyltoluene and alphamethylstyrene; esters of (meth)acrylic acid and alcohols of 1 to about 18 carbon atoms such as methyl (meth)acrylate, ethyl (meth)acrylate, propyl(methacrylate), n-butyl(meth)acrylate, isobutyl(meth)acrylate, cyclohexyl (meth)acrylate, 2-ethylhexyl(meth)acrylate and lauryl(meth) acrylate; vinyl esters of carboxylic acid of 2 to 11 carbon atoms such as vinyl acetate, vinyl propionate and vinyl 2-ethylhexanoate; as well as vinyl chloride, acrylonitrile and methacrylonitrile. They may be used either alone or in the form of a mixture of two or more.

Acrylic resins useful for thermosetting powder coatings generally have glass transition temperatures ($T_g$) above about 65° C. and melting ranges between 70–110° C. to ensure the necessary physical stability and ease of application. In addition to this, they generally possess reactive groups so that they can be crosslinked after application to the substrate. Two types of acrylic resins have been developed to fulfill these requirements, namely hydroxy functional acrylic resins that can be crosslinked with blocked isocyanates and epoxy functional acrylic resins that can be crosslinked with a crystalline dibasic aliphatic acids such as decanedicarboxylic acid and dodecanedicarboxylic acid.

As already mentioned above, catalysts or accelerators may be used to increase the rate of reaction between a resin and a hardener and are included within the film forming resin composition. They are usually added at levels between 0.1 to 1.0% and can be used to either reduce the curing time at a given temperature or alternatively, reduce the curing temperature. The catalyst employed depends on the film forming resin and the hardener. Typical catalysts include imidazoles, cyclic amidine, alkyl/aryl ammonium halides, and zinc alkyl/aryl thiocarbamates.

The concentration of the film forming resin composition in the powder coating composition will vary depending on whether the powder coating composition is a pigmented or clear (i.e. not having any pigments) system. Typically, the concentration of the film forming resin composition will be 45 to 95%, more preferably 60 to 90% by weight based on the total weight of the powder coating composition.

The Additive (b)

The second major component of the powder coating composition of this invention is a non-flatting and slip-enhancing amount of an additive (b). The words "non-flatting and slip-enhancing amount" denote any amount of the additive (b) that is sufficient to provide the inventive powder coatings with non-flatting and slip-enhancing property. In one embodiment the additive (b) is present at a level of at least about 0.01% by weight of the coating composition. In one embodiment, it is present at a level of 0.01 to 5%; in one embodiment 0.1 to 3%; and in one embodiment 0.2 to 2% by weight of the coating composition. The words "non-flatting" denote that the additive (b) when incorporated in a coating composition is able to retain at least about 75% of the initial gloss. The words "initial gloss" denote the gloss of the cured coating composition without the additive (b). Gloss is usually measured according to test method ASTM D-523. In one embodiment, at least about 85% of the initial gloss is retained. In one embodiment, at least about 95% of the initial gloss is retained. In one embodiment, the gloss is enhanced compared to the initial gloss. The words "slip-enhancing" denote that a cured powder coating composition containing the additive (b) has an improved (i.e. lower) coefficient of friction compared to a powder coating composition without the additive (b). Coefficient of friction measurements are usually made according to test method ASTM D-4518. The additive (b) of the present invention is a non-crosslinked reaction product made by reacting an organic hydroxy compound and a carboxylic acid or a reactive equivalent of said carboxylic acid.

The Organic Hydroxy Compound

Suitable organic hydroxy compounds include mono- or polyhydric hydrocarbon-based alcohols such as methanol, ethanol, the propanols, butanols, pentanols, hexanols, heptanols, octanols and decanols; also included are fatty alcohols and mixtures thereof, including saturated alcohols such as lauryl, myristyl, cetyl, stearyl and behenyl alcohols, and unsaturated alcohols such as palmitoleyl, oleyl and eicosenyl. Higher synthetic monohydric alcohols of the type formed by the Oxo process (e.g., 2-ethylhexano), by the aldol condensation, or by organoaluminum-catalyzed oligomerization of alpha-olefins (especially ethylene), followed by oxidation, are also useful. These higher alcohols are discussed in detail under the title "Alcohols, Higher Aliphatic" in Kirk-Othemer, *Encyclopedia of Chemical Technology*, Third Edition, Vol. 1, pp. 716–754.

Also useful as organic hydroxy compounds are the alicyclic analogs of the above-described alcohols; examples are cyclopentanol, cyclohexanol and cyclododecanol. Also useful are aliphatic substituted aromatic alcohols such as benzyl alcohol and 2-Naphthalenemethanol.

The preferred monhydric alcohols are the straight chain alcohols containing 10 to 24 carbon atoms.

Polyhydroxy compounds are also useful. These include ethylene, propylene, butylene, pentylene, hexylene and heptylene glycols wherein the hydroxy groups are separated by 2 carbon atoms; tri-, tetra-, penta-, hexa- and heptamethylene glycols and hydrocarbon-substituted analogs thereof (e.g., 2-ethyl-1,3-trimethylene glycol, neopentyl glycol), as well as polyoxyalkylene compounds such as diethylene and higher polyethylene glycols, tripropylene glycol, dibutylene glycol, dipentylene glycol, dihexylene glycol and diheptylene glycol, and their monoethers.

Also useful are sugar alcohols of the general formula $$HOCH_2(CHOH)_{1-5}CH_2OH$$

such as glycerol, sorbitol, mannitol, ribitol, etc., and their partially esterified derivatives, and methylol polyols such as pentaerythritol and its oligomers (di- and tripentaerythritol, etc.), trimethylolethane and trimethylolpropane. Such compounds are described under the title "alcohol, Polyhydric" in Encyclopedia of Chemical Technology, Vol. 1, pp. 754–789.

The preferred polyhydroxy compounds are alcohols which comprise 2 to 10 hydroxyl groups, more preferably 2 to 6 hydroxyl groups (e.g., ethylene glycol, glycerol, trimethylolethane, trimethylolpropane, pentaerythritol, sorbitol, sorbitan, mannitol, ribitol, and inositol).

The Carboxylic Acid

The carboxylic acids used to prepare the non-flatting slip-enhancing additives of this invention can be a mono-, di-, or a polycarboxylic acid, represented by the formula B—(COOH)$_z$, or a reactive equivalent thereof, wherein B is a direct link between two COOH groups, a mono-, di-, or a multivalent organic radical, and z represents the number of carboxyl groups. Preferably z is 1–10, more preferably 1–4. The carboxylic acids include aliphatic and aromatic carboxylic acids as well as polycarboxylic acid compounds having multiple carboxylic acid functionalities or reactive equivalents thereof, such as esters, anhydrides or acyl halides. Monocarboxylic acids which may be used have the formula RCOOH, wherein R is a hydrocarbyl group, preferably an aliphatic group. Preferably R contains from 1 to 50 carbon atoms. Examples of aliphatic carboxylic acids include formic acid, acetic acid, propanoic acid, butanoic acid, decanoic acid, myristic acid, palmitic acid, oleic acid, stearic acid, isostearic acid, lauric acid, caprylic acid, capric and behenic acid. In an especially preferred embodiment, the carboxylic acid is a straight chain saturated 18 carbon carboxylic acid, namely stearic acid.

Also included among monocarboxylic acids are hydroxy-substituted monocarboxylic acids, such as 12-hydroxystearic acid and ricinoleic acid (castor oil acid).

Compounds useful as the di- or polycarboxylic acid in this invention can be selected from any aromatic, aliphatic or cycloaliphatic, straight chain or branched chain, saturated or unsaturated dicarboxylic acid which have at least 2 carbon atoms, and more preferably 3 to 40 carbon atoms. Examples of these are oxalic acid, malonic acid, succinic acid, glutaric acid, adipic acid, pimelic acid, suberic acid, sebacic acid, azelaic acid, undecanedioic acid, 1,11-undecanedicarboxylic acid, dodecanedioic acid, hexadecanedioic acid, docosanedioic acid, maleic acid, fumaric acid and the like either alone or mixtures thereof. The term "dicarboxylic acid" is also used to include hydroxy substituted dicarboxylic acids. Representative of hydroxy substituted dicarboxylic acids are tartaric acid, citric acid and hydroxyisopthalic acid.

Dicarboxylic acids can also include the substituted succinic-acids represented by the formula $$R—CH(COOO)CH_2COOH$$

wherein R is a hydrocarbyl group, including an olefin polymer-derived group formed by polymerization of such monomers as ethylene, propylene, 1-butene, isobutene, 1-pentene, 2-pentene, 1-hexene, and 3-hexene. Such groups usually contain 30 to 200, more often up to about 100 carbon atoms, Also useful are oligomers of fatty acids which are substantially comprised of dimerized fatty acids. They are normally called "dimer acids", and are made by the thermal coupling of unsaturated vegetable acids. They are available from Emery, Westvaco, Henkel, Unichema and other companies. Trade names of these dimer acids include Empol™ from Henkel Corporation, and Pripol™, from Unichema International. Illustrative examples of branched dimer acids are Empol™ 1004, Empol™ 1008, Empol™ 1018, Empol™ 1016. Dimer acids are described in U.S. Pat. Nos. 2,482,760, 2,482,761, 2,731,481, 2,793,219, 2,964,545, 2,978,468, 3,157,681, and 3,256,304.

In addition to the dicarboxylic acids, acids containing more than two carboxylic acid groups are also useful. Representative examples of these polybasic acids are trimellitic acid, trimesic acid, citric acid, 1,2,3,4-butanetetracarboxylic acid and the like. Polymerized polybasic acids which contain more than two carboxylic acid groups are also included in the definition of polybasic acids. The polymeric polybasic acids with 3 carboxylic acid groups are known as "trimer acids". These trimer acids are commercially available under the trade name Empol™ from Henkel Corporation-Emery Group, and Unidyme™ from Union Camp Corporation. Representative examples of these trimer acids are Empol™ 1040, Empol™ 1041. Polybasic acids which are mixtures of di, tri, tetra, penta, and hexacarboxylic acids are also useful for this invention.

Polyacid reaction products of unsaturated vegetable acids with acrylic acid and maleic anhydride are available from Westvaco under the product names Diacid™ 1550 and Tenax™ 2010, respectively.

The Reaction Product of the Hydroxy Compound and the Carboxylic Acid

The reaction product of the hydroxy compound and the carboxylic acid of the present invention contains at least one ester functionality, and at least one straight chain hydrocarbyl group of 10 to 100 carbon atoms. In one embodiment, the reaction product of the hydroxy compound and the carboxylic acid has 1 to 4 ester functionalities. Preferably the straight chain hydrocarbyl group will have 10 to 50 carbon atoms, and more preferably 12 to 24 carbon atoms. The straight chain hydrocarbyl group can come from either the carboxylic acid or the hydroxy compound. Furthermore, the reaction product of the hydroxy compound and the carboxylic acid should not be the result of cross-linking or polymerization reaction between two molecules, each having multiple hydroxy or carboxyl functionalities. Thus, both the hydroxy compound and the carboxylic acid should not at the same time contain reactive functionalities greater than two.

In one embodiment, the additive (b) of this invention is ethylene glycol distearate; in one embodiment, the additive (b) is glycerol distearate; in one embodiment the additive (b) is pentaerythrito tetrastearate.

In one embodiment, the additive (b) of this invention is a sorbitan ester.

The sorbitan esters include sorbitan fatty acid esters wherein the fatty acid component of the ester comprises a carboxylic acid of 10 to 100 carbon atoms, and in one embodiment 12 to 24 carbon atoms. Sorbitan is a mixture of anhydrosorbitols, principally 1,4-sorbitan and isosorbide:

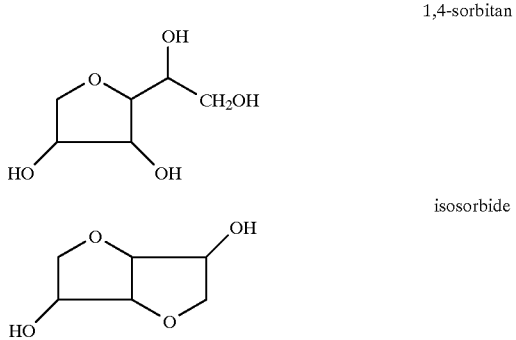

1,4-sorbitan isosorbide

Sorbitan, (also known as monoanhydrosorbitol, or sorbitol anhydride) is a generic name for anhydrides derivable from sorbitol by removal of one molecule of water. The sorbitan fatty acid esters of this invention are a mixture of partial esters of sorbitol and its anhydrides with fatty acids. These sorbitan esters can be represented by the structure below which may be any one of a monoester, diester, triester, tetraester, or mixtures thereof.

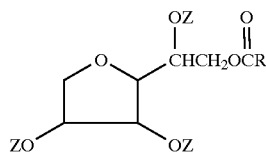

In the above formula, each Z independently denotes a hydrogen atom or C(O)R—, and each R mutually independently denotes a hydrocarbyl group of 9 to 99 carbon atoms, more preferably 11 to 23 carbon atoms. Examples of sorbitan esters include sorbitan stearates and sorbitan oleates, such as sorbitan stearate (i.e., monostearate), sorbitan distearate, sorbitan tristearate, sorbitan oleate and sorbitan sesquioleate. In one embodiment, the sorbitan ester is sorbitan tristearate. Sorbitan esters are available commercially under the tradenames Spans™ and Arlacels™ and are also sold by Calgene Chemical Company.

The sorbitan esters also include polyoxyalkylene sorbitan esters wherein the alkylene group has 2 to 24 carbon atoms. These polyoxyalkylene sorbitan esters can be represented by the structure

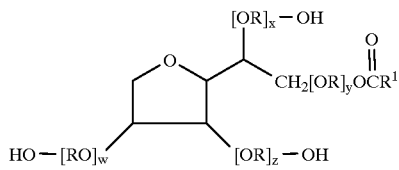

wherein each R independently is an alkylene group of 2 to 24 carbon atoms; $R^1$ is a hydrocarbyl group of 9 to 99 carbon atoms, more preferably 11 to 23 carbon atoms; and w, x, y, and z represent the number of repeat oxyalkylene units. For example ethoxylation of sorbitan fatty acid esters leads to a series of more hydrophilic surfactants, which is the result of hydroxy groups of sorbitan reacting with ethylene oxide. One principal commercial class of these ethoxylated sorbitan esters are those containing 5 to 80 ethylene oxide units. They are marketed by Calgene Chemical under the name "Polysorbate". Typical examples are polyoxyethylene (hereinafter "POE") (20) sorbitan tristearate (Polysorbate 65) and POE (20) sorbitan trioleate (Polysorbate 85), POE (5) sorbitan monooleate (Polysorbate 81), and POE (80) sorbitan monooleate (Polysorbate 80). As used in this terminology, the number within the parentheses refer to the number of ethylene oxide units present in the composition. The preferred sorbitan ester for the present invention is sorbitan tristearate, presently sold by Calgene Chemical Company as "Calgene STS". Preferably, the alkylene group of the polyoxyalkylene sorbitan esters is an alkylene group of 2 to 4 carbon atoms, i.e., it is selected from the group consisting of ethylene, propylene, butylene, and mixtures thereof.

Other Optional Components of the Powder Coating Composition

The powder coating compositions of this invention can also contain other additives, such as flow control additives, deaerating agents, pigments, fillers, and special effect additives.

Flow control additives are another component of a powder coating composition. In most (though not all) formulations, this component is highly desirable, as without it, it is very difficult to obtain cured films with good flow and appearance and without craters or other surface defects. The flow control additives can be a solid or a liquid; however they normally consist of highly viscous liquids based on polyacrylates. They are supplied either in the form of so-called masterbatches, i.e., they have been added to the resin by the resin manufacturer right after the resin cooking cycle and just prior to flaking, or the additive is absorbed on finely divided silica and can be added to the powder premix directly. Thus even though this component by itself, can be a liquid, the powder coating composition as a whole is in the form of a powder.

The powder coating composition of the present invention can also contain a deaerating agent, such as benzoin. Benzoin is said to act as an anti-pinholing agent and as a degassing aid, and it is generally believed that it improves the appearance of the cured coating.

Pigments can be defined as finely ground materials which are insoluble in the medium (binder) to be used and which provide color and hiding power to the coatings. Pigments can also influence many other important properties of the finished coating such as water permeability, flexibility and impact resistance.

Pigments can generally be divided into inorganic and organic pigments. Inorganic pigments include titanium dioxide, iron oxide, chromium oxide and carbon black. Organic pigments include blue pigments, such as copper phthalocyanine blue, indanthrone blue, carbozole violet; red pigments, such as cadmium red, quinacridone red, and thioindigo red; yellow pigments such as benzidine yellow, and benzimidazolone yellow; orange pigments, such as benzidine orange, green pigments, such as copper phthalocyanine green; and violet pigments such as quinacridone violet.

One or several pigments can be used in a powder coating formulation. The details of the use of pigments are well-known to those skilled in the art.

Fillers, also called extenders, are chemically inert materials that are insoluble in the binder to be used and which impart certain properties to the coating. Fillers can lower the cost of a final coating composition, and also affect such properties and gloss, flexibility, flow characteristics, storage stability, density and porosity. Some of the most commonly used fillers include lithopone, barium sulfate, silicates and calcium carbonates.

The powder coating composition can also include certain special effect additives. Special effects such as metallic finishes, hammertone finishes, textured or structured finishes, and low gloss coatings are, generally, more difficult to achieve with powder coatings than with conventional liquid coatings. Textured finishes can be obtained by the incorporation of certain inert additives such as polypropylene, nylon, and some special waxes. Hammertone finishes are achieved by the incorporation of a contaminant that competes against the flow of the resin system used. In fact, the cured coating can have many craters and in the presence of an aluminum pigment the hammertone effect will appear. Metallic finishes are difficult to achieve in powder coatings due to the lack of orientation effects of pigments or filler particles (due to very high viscosities during film formation). They can also be quite hazardous due to the combustible nature of the metallic pigments. Methods to incorporate metallic pigments to give a metallic finish to coatings include incorporation prior to the extrusion process, post-blending to the finished powder coating, and a special bonding process during which the metallic pigments are bonded to the surface of the powder particles after they have been ground. One method of achieving matt coatings is to blend together two finished and already ground powders of different reactivities. The resultant mixture will then yield a matt coating upon curing.

Application methods for powder coatings are known to those skilled in the art. They include the fluidized bed method, electrostatic fluidized bed method, electrostatic spray method, triboelectric spray method, use of internal and external corona guns, powder bells and powder rotary atomizers, the preferred method being the use of corona guns. Furthermore, the general manufacturing process for powder coatings is also be familiar to those skilled in the art, and include the stages of premixing, melt-mixing, and pulverizing.

The substrates for powder coatings include metal, wood and plastic, and glass. Examples of substrates that have been powder coated industrially include office furniture, appliances (such as refrigerators, freezers, washing machines) as well as automotive body panels.

The temperature used to heat the applied coating on suitable substrates to form the film varies depending on whether the coating composition is a thermoplastic or thermosetting system, with higher temperature being applied for curing the thermosets. The temperature for melting the coating composition ranges from 70 to 90° C. (for thermoplastics and thermosets); for curing of thermosets, the temperature is further raised to 150–200° C. The film thickness of the coating ranges from 10–500 microns (0.5–20 mils), more preferably 10–250 microns (0.5–10 mils). The cured coatings with the additive (b) are non-flatting and have enhanced slip properties compared to coatings without the additive (b).

An excellent source describing the chemistry, uses and applications of various resins and additives used in coatings is *Protective Coatings-Fundamentals of Chemistry and Compositions* by Clive H. Hare, Technology Publishing Company, Pittsburgh, Pa. (1994).

A particularly excellent source describing the chemistry, manufacture, and application of powder coatings is *Powder Coatings* by Josef H. Jilek, published by Federation of Societies for Coatings Technology, Darlene Brezinski & Thomas J. Miranda, Eds.(1993).

EXAMPLES

EXAMPLE 1

(Sorbitan tristearate in a polyester resin/isocyanate curative powder coating formulations)

Tables 7 shows a polyester resin/isocyanate curative powder coating formulation used in the evaluation of sorbitan tristearate as a non-flatting slip-enhancing.

TABLE 7

Polyester Resin/Isocyanate curative based Powder coating formulation used in evaluation of Sorbitan Tristearate as a Non-Flatting Slip-Enhancing Additive

| Raw Material Trade Name | A (Control) | B |
|---|---|---|
| RUCO ™ 102[1] | 56.86 | 56.01 |
| RUCO ™ NI-2[2] | 9.74 | 9.59 |
| Uraflow ™ B[3] | .40 | .40 |
| Resiflow ™ P67[4] | 1.0 | 1.0 |
| Blanc Fixe Micro[5] | 30.0 | 30.0 |
| Sorbitan tristearate | — | 1.0 |
| Special Black #4 | 2 | 2 |

[1] Polyester resin (Ruco Polymers);
[2] (Isocyanate-containing curative (Ruco Polymer);
[3] Benzoin (release agent; GCA Chemical);
[4] Flow agent (Estron Chemical);
[5] Inert filler (precipitated $BaSO_4$; Sachtleben (ORE Chemicals));
[6] Carbon black pigment (Degussa)

The performance results are shown in Table 8.

TABLE 8

Test Results of Powder Coating Compositions of Table 7

| Test Measurements | A (Control) | B |
|---|---|---|
| gloss (60°) (ASTM D523) | 87 | 87 |
| gloss (20°) (ASTM D523) | 48–50 | 57–60 |
| DOI (Distinction of Image) (ASTM E430-91 & E284) | 30 | 41 |
| Color CIELAB Spectral included (ASTM D2244-93) | | |
| DL | — | -0.19 |
| Da | — | -0.03 |
| Db | — | 0.08 |
| DE | — | 0.16 |
| Appearance (Visual) | OK | OK |
| Film build (mils) | 1.4–2.0 | 1.1–2.0 |
| Coefficient of Friction (D4518) | | |
| Max static | 0.1306 | 0.0551 |
| (Dynamic) Ave. | 0.1144 | 0.0680 |
| Standard deviation. | 0.0110 | 0.0061 |

Processing:
Premix- 30 secs. wearing blender
Extruding: Baker-Perkins APV MP19PC 15:1 twin screw extruder
Barrel 90° C. Zone 1; 110° C. Zone 2; RPM = 350; Feeder 25; Rolls 21.9
Components were ground using bench top grinder, sieved through a 140 mesh screen, and sprayed using Nordson Versaspray II powder spray gun.
Substrate: Phosphate coated cold rolled steel panel-Bonderite 1000 Parkalene 60 deionized water rinsed, unpolished
Cure: 15 minutes @ 191° C. (375° F.) in precision electric oven Compared to the control formulation without any slip additive (formulation A), the results with sorbitan tristearate (formulation B) in the above Polyester resin/Isocyanate curative formulation show improved 20° gloss, equivalent 60° gloss, and improved slip properties (lower coefficient of friction).

EXAMPLE 2

(Sorbitan tristearate evaluated in a epoxy-polyester hybrid resin based powder coating formulation)

Table 9 shows an epoxy-polyester hybrid resin based powder coating formulation used in evaluating sorbitan tristearate as a non-flatting slip-enhancing additive.

TABLE 9

Epoxy-Polyester Hybrid based Powder Coating Formulation used in the evaluation of Sorbitan Tristearate.

| Raw Material Trade Name | A (Control) | B | C |
|---|---|---|---|
| Uralac ™ P 5127[1] | 33.6 | 33.6 | 33.6 |
| D.E.R. 663U[2] | 33.6 | 33.6 | 33.6 |
| Blanc Fixe F[3] | 30.4 | 30.4 | 30.4 |
| Special Black #4[4] | 1.0 | 1.0 | 1.0 |
| Lanco-Flow ™ P10[5] | 1.0 | 1.0 | 1.0 |
| Benzoin[6] | 0.4 | 0.4 | 1.0 |
| Sorbitan tristearate (micronized) | — | 1.0 | — |
| Sorbitan tristearate (flakes) | — | — | 1.0 |

[1]Saturated carboxylated Polyester resin (DSM Resins BV);
[2]Bisphenol A based epoxy resin (Dow Chemical);
[3]Inert filler (precipitated $BaSO_4$; Sachtleben (ORE Chemicals));
[4]carbon black pigment (Degussa);
[5]Flow control agent (Lubrizol);
[6]Release agent (GCA Chemical);

Performance results are shown in Tables 10.

TABLE 10

Test Results of Powder Coating Compositions of Table 9

| Test Measurements | A (Control) | B | C |
|---|---|---|---|
| gloss (60°) (ASTM D523) | 100 | 93 | 94 |
| gloss (20°) (ASTM D523) | 89 | 78 | 82 |
| Coefficient of Friction (Dynamic) (ASTM D4518) | 0.215 | 0.080 | 0.095 |

Processing:
Premixing- Powder coating components were weighed up and mixed in a bag.
Extruding- All materials were extruded twice with a "APV 19PC" twin screw extruder with a barrel length of 15 L/D at following parameters;
Barrel zone 1: 60° C.
Barrel zone 2: 100° C.
melting temperature: 70–75° C.
screw r.p.m.: 300
torque: 60–70%
Grinding- After crushing, the samples were ground with a Retsch Z-100 mill. Then the coatings were sieved with a 100 μm sieve.
Application- The coatings were sprayed with a powder-manual-pulverizing tool on aluminum panels by the Corona- method:
Voltage: 80 KV
Delivery air: 1.2 bar
Curing- The panels were cured at 160° C. for 18 minutes.

In the Epoxy-Polyester blend formulation, the results with sorbitan tristearate (formulations B and C, table 10) show somewhat lower gloss compared to the control, and improved slip properties.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the amount, range, and ratio limits set forth herein may be combined. As used herein, the expression "consisting essentially of" permits the inclusion of substances which do not materially affect the basic and novel characteristics of the composition under consideration.

What is claimed is:

1. A powder coating composition, comprising:
   (a) a film forming resin composition; and
   (b) a non-flatting and slip-enhancing amount of an additive comprising a non-crosslinked reaction product of a hydroxy compound and a carboxylic acid or a reactive equivalent of said carboxylic acid; said reaction product comprising at least one ester functionality and at least one straight chain hydrocarbyl group of about 10 to about 100 carbon atoms;
   wherein said powder coating composition as a whole is in the form of a powder.

2. The composition of claim 1, further comprising:
   (c) a flow control agent
   (d) a deaerating agent; and
   (e) a pigment.

3. The composition of claim 2 wherein components (a), (b), (d), and (e) of said composition are in the form of a solid, and component (c) is in the form of a solid or liquid.

4. The composition of claim 3 wherein component (c) is in the form of a liquid.

5. The composition of claim 3 wherein component (c) is in the form of a solid.

6. The composition of claim 1 wherein the film forming resin composition (a) comprises a thermoplastic resin.

7. The composition of claim 1 wherein the film forming resin composition (a) comprises a thermosetting resin.

8. The composition of claim 1 wherein the film forming resin composition (a) comprises a resin selected from the group consisting of epoxy resins, oil-free polyester resins, acrylic resins, and mixtures of two or more thereof.

9. The composition of claim 1 wherein the film forming resin composition (a) comprises a polyester resin and an isocyanate-containing curative.

10. The composition of claim 9 wherein the isocyanate-containing curative is an ε-caprolactam blocked isophorone diisocyanate.

11. The composition of claim 1 wherein the film forming resin composition (a) comprises an epoxy-polyester hybrid resin.

12. The composition of claim 11 wherein the epoxy-polyester hybrid resin comprises a type 3–3.5 bisphenol A epoxy resin.

13. The composition of claim 11 wherein the epoxy-polyester hybrid resin comprises a saturated, carboxylated polyester resin.

14. The composition of claim 1 wherein the hydroxy compound comprises 1 to about 10 hydroxyl groups.

15. The composition of claim 1 wherein the hydroxy compound comprises about 2 to about 6 hydroxyl groups.

16. The composition of claim 1 wherein the hydroxy compound is selected from the group consisting of ethylene glycol, glycerol, pentaerythritol, and mixtures of two or more thereof.

17. The composition of claim 1 wherein the hydroxy compound is selected from the group consisting of inositol, sorbitol, mannitol, ribitol, and mixtures of two or more thereof.

18. The composition of claim 1 wherein the hydroxy compound is sorbitol.

19. The composition of claim 1 wherein the hydroxy compound is sorbitan.

20. The composition of claim 1 wherein the carboxylic acid contains 1 to about 10 carboxyl groups.

21. The composition of claim 1 wherein the carboxylic acid contains 1 to about 4 carboxyl groups.

22. The composition of claim 1 wherein the carboxylic acid contains about 10 to about 100 carbon atoms.

23. The composition of claim 1 wherein the carboxylic acid contains about 12 to about 24 carbon atoms.

24. The composition of claim 1 wherein the carboxylic acid is stearic acid.

25. The composition of claim 1 wherein the hydroxy compound is glycerol and the carboxylic acid is stearic acid.

26. The composition of claim 1 wherein the hydroxy compound is ethylene glycol and the carboxylic acid is stearic acid.

27. The composition of claim 1 wherein the hydroxy compound is pentaerythritol and the carboxylic acid is stearic acid.

28. The composition of claim 1 wherein the additive (b) comprises glycerol distearate.

29. The composition of claim 1 wherein the additive (b) comprises ethylene glycol distearate.

30. The composition of claim wherein the additive (b) comprises pentaerythritol tetrastearate.

31. The composition of claim 1 wherein the additive (b) comprises a sorbitan ester.

32. The composition of claim 31 wherein the sorbitan ester comprises a sorbitan fatty acid ester, the fatty acid component of said ester comprising a carboxylic acid of about 10 to about 100 carbon atoms.

33. The composition of claim 32 wherein the fatty acid comprises a carboxylic acid of about 12 to about 24 carbon atoms.

34. The composition of claim 31 wherein the sorbitan ester comprises a sorbitan stearate, a sorbitan oleate, or a mixture thereof.

35. The composition of claim 34 wherein the sorbitan stearate is sorbitan tristearate.

36. The composition of claim 31 wherein the sorbitan ester comprises a polyoxyalkylene sorbitan ester wherein the alkylene group contains about 2 to about 24 carbon atoms.

37. The composition of claim 36 wherein the alkylene group of the polyoxyalkylene sorbitan ester is selected from the group consisting of ethylene, propylene, butylene and mixtures of two or more thereof.

38. The composition of claim 1 wherein the additive (b) is used at a level of at least about 0.01% by weight of the powder coating composition.

39. The composition of claim 1 wherein the additive (b) is used at a level of about 0.2% to about 5% by weight of the composition.

40. A powder coating composition comprising:
   (a) a film forming resin; and
   (b) a non-flatting slip-enhancing amount of a sorbitan ester; wherein said powder coating composition as a whole is in the form of a powder.

41. A method for coating a substrate comprising the steps of:
   (I) applying a powder coating composition on said substrate, said powder coating composition comprising:
      (a) a film forming resin composition; and
      (b) a non-flatting and slip-enhancing amount of an additive comprising a non-crosslinked reaction product of a hydroxy compound and a carboxylic acid or a reactive equivalent of said carboxylic acid; said reaction product comprising at least one ester functionality and at least one straight chain hydrocarbyl group of about 10 to about 100 carbon atoms; wherein said powder coating composition as a whole is in the form of a powder; and
   (II) heating the applied powder coating composition from step (I) to form a film.

42. The method of claim 41 wherein the film-forming resin composition (a) comprises a thermosetting resin.

43. The method of claim 41 wherein the film forming resin composition (a) is selected from the group consisting of epoxy resins, polyester resins, acrylic resins, and mixtures of two or more thereof.

44. The method of claim 41 wherein the film forming resin composition (a) comprises a polyester resin and an isocyanate-containing curative.

45. The method of claim 41 wherein the film forming resin composition comprises an epoxy-polyester hybrid resin.

46. The method of claim 41 wherein the additive (b) comprises a sorbitan ester.

47. The method of claim 46 wherein the sorbitan ester comprises a fatty acid ester of sorbitan, wherein the fatty acid is a carboxylic acid of about 10 to about 100 carbon atoms or a reactive equivalent thereof.

48. The method of claim 47 wherein the sorbitan ester is a sorbitan stearate or a sorbitan oleate.

49. The method of claim 48 wherein the sorbitan stearate is sorbitan tristearate.

50. The method of claim 41 wherein at least about 75% of the initial gloss is retained.

51. The method of claim 41 wherein at least about 85% of the initial gloss is retained.

* * * * *